(12) United States Patent
Pirilä et al.

(10) Patent No.: US 7,505,445 B2
(45) Date of Patent: Mar. 17, 2009

(54) CONTROLLING USER EQUIPMENTS

(75) Inventors: Hannu I. Pirilä, Littoinen (FI); Harri Jokinen, Pertteli (FI)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 11/262,741

(22) Filed: Nov. 1, 2005

(65) Prior Publication Data
US 2006/0092897 A1 May 4, 2006

(30) Foreign Application Priority Data
Nov. 2, 2004 (GB) .................................. 0424262.4

(51) Int. Cl.
*H04Q 7/24* (2006.01)
(52) U.S. Cl. ...................... 370/338; 370/465
(58) Field of Classification Search ................ 370/338, 370/465; 455/411, 456.2; 701/200
See application file for complete search history.

(56) References Cited

U.S. PATENT DOCUMENTS 6,343,213 B1 * 1/2002 Steer et al. ............... 455/411
6,718,175 B1   4/2004 Edstam
2006/0200306 A1 * 9/2006 Adamcyzk ................. 701/200

FOREIGN PATENT DOCUMENTS

WO    WO 98/34421    8/1998

* cited by examiner

*Primary Examiner*—Lester Kincaid
*Assistant Examiner*—Phuoc Doan
(74) *Attorney, Agent, or Firm*—Squire, Sanders & Dempsey, L.L.P.

(57) ABSTRACT

A system and method controls the use of user equipments within an access network configured to allow user equipments to access a communication system in an environment, wherein wireless access to the communication system is restricted. The system includes a detector network configured for receiving requests for wireless access from user equipments and for detecting such user equipments that seek to use the detector network for communication instead of an allowed access network.

20 Claims, 2 Drawing Sheets

CONTROLLING USER EQUIPMENTS

BACKGROUND OF THE INVENTION

1. Field of the Invention

The present disclosure relates to controlling user equipments, and in particular, but not exclusively, to detection of unwanted use of user equipments.

2. Description of the Related Art

A communication system can be seen as a facility that enables communication sessions between two or more entities such as user equipment and/or other nodes associated with the communication system. The communication may comprise, for example, communication of voice, data, multimedia and so on. A user equipment connected to a communication system may, for example, be provided with a two-way telephone call or multi-way conference call or with a data connection. A user equipment may communicate packet data to and/or from a server entity, or to and/or from at least one other user equipment.

Communication systems providing wireless communication for user equipment are also known. These systems are commonly referred to as mobile systems or wireless access systems. An example of the mobile systems is the public land mobile network (PLMN). A PLMN is commonly based on cellular architecture. Mobility and/or wireless access may also be provided, at least partially, by means of communication satellites. In certain systems the mobility may be restricted to small areas, examples of such wireless access systems including wireless local area networks (WLAN) and local cordless telephone systems.

In a common wireless system an access network serves a plurality of user equipment. The access network (AN) enables the user equipment to access the core part of a communication network that links the access network to other access networks or communication networks. Each access network is provided with at least one controller which may be connected to appropriate core network entities. For example, the third generation (3G) Wideband Code Division Multiple Access (WCDMA) networks employ access network control entities known as radio network controllers (RNC). In the second generation (2G) GSM (Global System for mobile) the access network is understood to be controlled by a base station controller (BSC). One or more gateway nodes may be provided for connecting a core network to other networks. For example, a mobile core network may be connected to other mobile or fixed line communication networks or communication networks such as an IP (Internet Protocol) and/or other packet data networks.

Typically an access network is provided with at least one station, commonly referred to as a base station. A user equipment may communicate wirelessly with two or more stations and/or access networks at the same time. Communication on the wireless interface between the user equipment and the access network can be based on an appropriate communication protocol.

Mobile communication systems have proven very popular. A great number of users are using routinely their mobile user equipment, especially cellular telephones, when and where ever required. However, there are locations and situations where the use of mobile user equipment may not be desired, or may even be dangerous. For example, use of mobile user equipments in an aircraft may cause a safety risk because of the sensitivity of the electronics of the aircraft ("avionics") to electromagnetic radiation emitted by the mobile user equipment. Similarly, electronic equipment in places or environments such as ships, hospitals, monitoring and/or control rooms, laboratories and so on may be disturbed by radiation from mobile user equipment.

On the other hand, a growing number of users would like to communicate even when in environments such as aircrafts, ships, hospitals and so forth. Attempts to meet this demand have included installation of special phone systems for these places. However, the users have not always been willing to use these systems. The reasons for reluctance include inconvenience caused by, for example, the lack of address/phone book features of the common telephones and unfamiliarity of the operation of the system. Some users may have been put off by the presumption that the usage of such systems is costly.

A number of studies have been carried out to investigate the possible risks, especially in the field of aircrafts. These studies show that, under the right conditions, it is believed to be safe to allow the use of mobile user equipment in an environment such as an aircraft or in a hospital. This has lead to suggestions that the users should be able to use their own user equipment in such an environment while the wireless access is provided by a system that is known to be safe. The access system should also preferably be controlled by a body who has the responsibility over the environment.

There are also other, less technical but nevertheless important reasons why use of mobile user equipment may not be appropriate in all locations. For example, cellular telephones may unwittingly disturb occasions such as concerts, plays, speeches and so on. Some people might prefer that use of mobiles is not allowed in public places such as train carriages, busses, waiting rooms, art galleries and so on. A yet another example is occasions where a user needs to be isolated from the others. Such situations may arise, for example, during an exam or in a prison. In all these occasions it would help if it could be possible to detect any improper use of mobile user equipment.

The following considers an arrangement that has been proposed for a service permitting use of mobile user equipment while onboard an aircraft. The proposed concept is based on the idea of having an onboard access network which is linked to a ground based communication system. This allows controlled wireless traffic between the aircraft and the ground instead of uncontrolled traffic between individual mobile station and access networks on the ground. For this type of a service a body other than the actual operator of a subscriber may act as a mobile roaming operator. As such the body need not to have any subscribers of its own but may provide "real" operators with a possibility to offer roaming services to their subscribers when they are on-board an aircraft. A user onboard is enabled to switch on his/her wireless user equipment during the flight and use it to initiate and receive communications in the same way as when roaming in a visited network. According to a more sophisticated approach the user equipment may be switched automatically to a "flight safe mode".

However, in real life situations it is possible that not all wireless user equipments are either switched off or registered with the onboard access network of the aircraft. For safety reasons the flight attendants nevertheless need to be sure that no such user equipment exists, and that all user equipment are either moved to the safe mode, either manually or automatically, or switched off before take off and throughout the entire flight. It may also be desirable to provide an onboard service for user equipment which does not support any specific automatic or other ensured safe mode switching, i.e. for user equipments which may be more likely to seek service from a non-allowed access system. Such equipment may access the onboard system by use of manual network selection to register to the onboard access system. However, in order to allow use of such user equipment, a verification system against accidental inappropriate use might be desired. It would therefore be useful to have a system in place for detecting that no user equipment other than those connected to the controlled system of the aircraft are in use.

It is appreciated that the problem is not limited to aviation environments. Similar problem and need may occur in any environment where there is a need to detect unauthorized or improper wireless access by user equipments. In addition to cellular systems, similar problems may need to be solved in other wireless access technologies, such as WLAN and Bluetooth.

SUMMARY OF THE INVENTION

Embodiments of the present invention aim to address one or several of the above problems.

According to an embodiment, there is provided a system for controlling use of user equipments within an access network configured to allow user equipments to access a communication system in an environment wherein wireless access to the communication system is restricted. The system comprises a detector network configured for receiving requests for wireless access from user equipments and for detecting such user equipments that seek to use the detector network for communication instead of an allowed access network.

According to another embodiment, there is provided a network for controlling use of user equipments within an access network configured to allow user equipments to access a communication system in an environment wherein wireless access to the communication system is restricted. The network comprises a detector network covering at least partially the access area of the allowed access network. The detector network is configured for receiving requests for wireless access from user equipments and for detecting such user equipments that seek to use the detector network for communication instead of the allowed access network.

According to still another embodiment, there is provided a controller for controlling use of user equipments within an access network configured to allow user equipments to access a communication system in an environment wherein wireless access to the communication system is restricted. The controller is configured for controlling a detector network covering at least partially the area of the allowed access network, for analyzing requests for wireless access from user equipments, and for detecting such user equipments that seek to use the detector network for communication instead of the allowed access network.

According to yet another embodiment, there is provided a method for controlling use of wireless user equipments within an access network. The method comprises receiving requests for wireless access from user equipments within a first access network configured to allow user equipments to access a communication system in an environment wherein wireless access to the communication system is restricted, and monitoring by a detection network for user equipments that are seeking for communication via another access network than the first access network based on wireless signals transmitted by the user equipments.

The embodiments of the invention may provide a way of detecting unwanted use of wireless user equipment. In certain embodiment wireless access by incompatible user equipment of user equipment in incorrect mode of operation may be prevented.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

Figure 1:
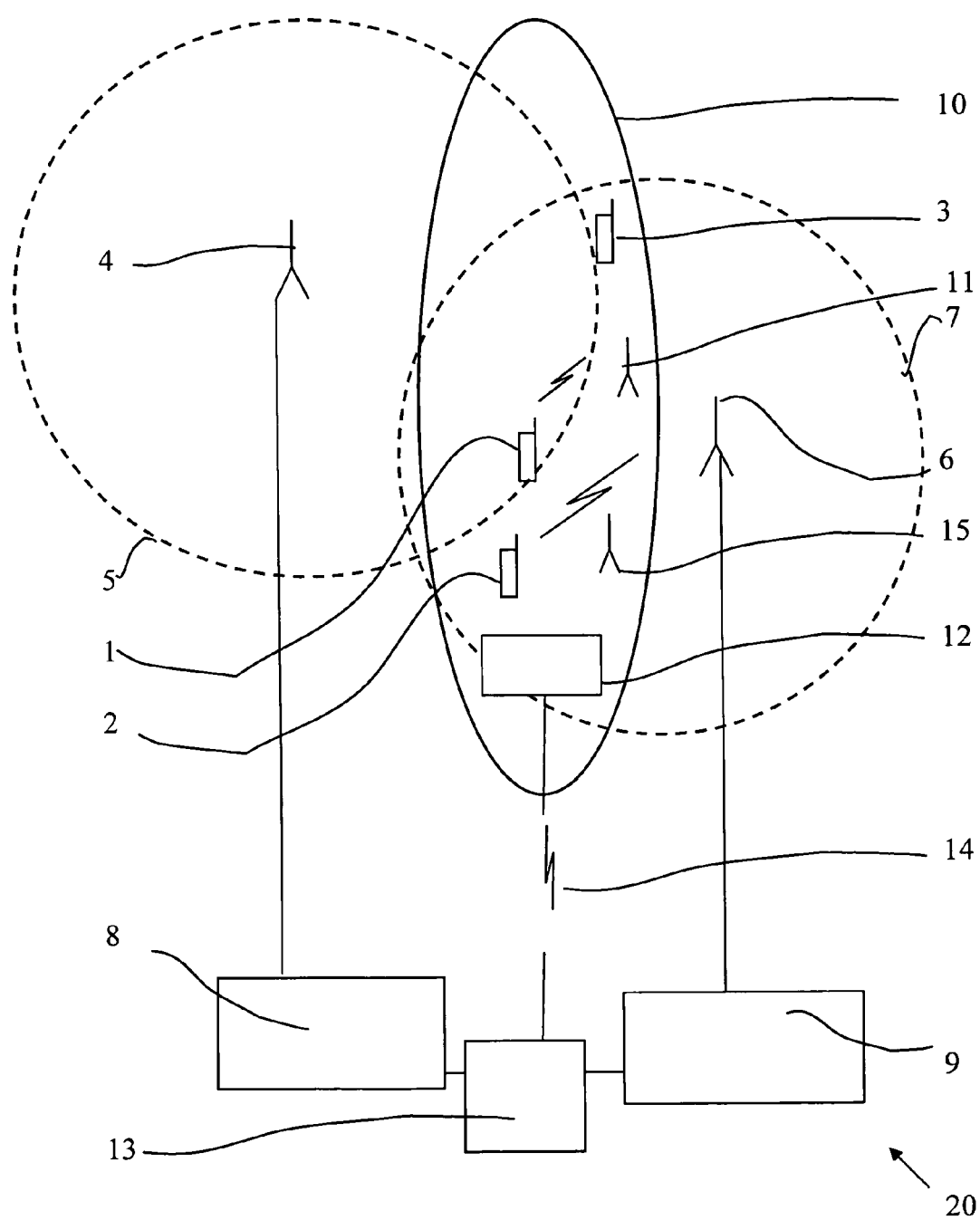
FIG. 1 shows a system embodying the present invention.

A reference is first made to FIG. 1 illustrating a mobile communication system and also a detection system in accordance with an embodiment of the invention. The underlying mobile communication system 20 of FIG. 1 may be provided by a plurality of known mobile communication networks, and may be operated by different operators.

In a typical mobile communication network, for example the cellular public landline mobile network (PLMN), a number of access networks 5 and 7 is provided by means of base stations 4 and 6. Each of the base stations of the access networks is arranged to wirelessly transmit signals to and receive signals from a plurality of mobile user equipment 1, 2 and 3. Such PLMN access networks are commonly referred to as cells, hence the name cellular systems.

Only two access networks 5 and 7, base stations 4 and 6, and access network controllers 8 and 9 are shown in FIG. 1 for clarity. The wireless communication between the user equipment and the access network can be based on any appropriate communication protocol and access technology. Non-limiting examples include access based on systems such as the CDMA (Code Division Multiple Access), WCDMA (Wideband CDMA), TDMA (Time Division Multiple Access), FDMA (Frequency Division Multiple Access), or SDMA (Space Division Multiple Access) and hybrids thereof.

Likewise, each of the mobile user equipment 1 to 3 is able to transmit wireless signals to and receive signals from appropriate access network. An appropriate user equipment is provided with required radio transmission elements and controller functions so that it is enabled to send and receive data from the access networks, and process control instructions it may receive from an access network and to transmit control information to an access network A mobile user equipment is able to move within an access network and also from one access network to another access network. In addition, a mobile user equipment may also be enabled to roam into another communication network of the mobile communication system. The basic principle of roaming was already described above, and is hence not repeated in here.

The architecture of the overall communication system of FIG. 1 for onboard passengers is comprised of the element of an airborne system, an air to ground interface 14, and a ground infrastructure 20. The two last mentioned may be based on any appropriate conventional systems, and therefore the following will focus on the airborne system.

FIG. 1 shows a further access network 10 which in the exemplifying embodiment approximately corresponds to the interior of an aircraft. The access network is shown to be provided by a base station 11. It will be understood that in a practical application the number of onboard base stations may need to be greater than one. Operation of the further access network 10 is controlled by onboard controller 12. As shown by FIG. 1, the onboard controller 12 may be in communication with the elements of the land based communication system 20 via an appropriate gateway node 13 and wireless interface 14.

The onboard system handles communications with the wireless user equipment on-board the aircraft and connects to the ground system, for example via a satellite unit. The onboard system may use architecture that can be compared to that used for mobile communication on the ground. It has been proposed that the onboard system should be compliant with at least one existing standard such that it is compliant with the roaming framework rules to allow procedures such as automatic user registration and billing.

In accordance with the roaming rules, a mobile user equipment, when in standby or idle modes, may listen to the surrounding access networks. If an access network has been detected, the user equipment tries to connect to the access network using a transmitted power as indicated by the access network, for example in a system broadcast message. The user equipment then transmits only up to the maximum power level indicated by the network. This makes it possible to limit the transmission power of a user equipment to a level that is believed to be safe for a particular environment, for example an aircraft, if a discrete cell is created within the aircraft. Most mobile user equipment such as cellular phones have a transmitted power range from a milliwatt to up to two watts, and if an aircraft carries its own cell, the amount of power needed by mobile user equipment to connect will be minimal, thus reducing the amount of electromagnetic radiation and therefore considerably reducing the risk of interference with the avionics of the aircraft.

In addition to the access network 10, a second onboard access network is provided by means of a second base station 15. Again, in practical applications the number of onboard base stations for the second onboard network may need to be greater than one. The second onboard network may be controlled by the controller 12, or a separate onboard controller may be provided for the control thereof.

The second onboard network may configured such that the user equipment would see it as just another access network. The second network may also be configured such that that it does not allow wireless access for a user equipment to the communication system 20. Instead, the second network is configured to operate as a detection network for picking up any user equipment which are not switched to a safety mode where the user equipment can only communicate with the first access network 10, or off altogether.

More particularly, in the example of FIG. 1 mobile user equipment 1 is shown to be switched to an appropriate safety mode so that in can only communicate via the base station 11 of the onboard access network 10. Mobile user equipment 2, however, is not so switched, and therefore is seeking for an appropriate access network. Three possible networks are available for the user equipment 2, namely access network 7 of the PLMN system 20, the onboard access network 10, and the detection network provided by base station 15. In accordance with the principles of mobile roaming, the user equipment 2 may thus select one of these networks as the access network. The selection algorithms of the PLMN may be utilized for this purpose. The selection may be based on one of the following possible scenarios.

The second onboard access network may be configured to have better radio characteristics than the first onboard network 10 and/or any other possible access network 7, thereby ensuring that if a user equipment is not in a mode wherein it is forced to communicate with the first onboard access network 10, it will necessarily select the detection network provided by base station 15.

Other methods may also be used as an alternative or in addition to the above to guide the user equipment 2 to select the detector network. For example, the detector network may use an identity of a PLMN which is a likely to be the last local PLMN used by the user equipment, for example a PLMN it determines as having the strongest access network.

The detection network may indicate a different PLMN for the user equipment so as to guide end user to activate flight safe mode. For example, data indicating the name of the PLMN may be coded to inform the user equipment to "Start Flight Safe Mode immediately".

If a safety or other "free access" prevention mode is activated, see user equipment 1 in FIG. 1, the user equipment will not even try to attach to other networks, such as the network 7 or the detector network. Instead, the user equipment 1 will seek for registration with the onboard access network 10. The safety mode may be for example a Flight Safe Mode, and may be switched on manually or automatically. However, if a user equipment remains in a "wrong" mode, it will seek for registration with any network, including, the detector network, where after such as user equipment can be detected from the signaling received from it.

In accordance with a further embodiment, the user equipment accessing the detector network, and event the user thereof, may be identified. A possible way of identification is based on the IMSI (International Mobile Subscriber Identity). In this case an access to the subscriber database of the service provider of the particular subscriber may be needed. The passenger database may also be utilized. According to a possibility the actual radio transmission can be detected on the known frequency of the detector cell, for example by using directional detectors, at least to an accuracy of a few meters. Furthermore, the detector network may force the user equipment to send a response, including an identifier or some other indication that then enables locating the device based on radio activity. It shall be noted that even if the actual origin of misuse cannot be identified, it helps if the cabin crew are aware of the misuse and can ask passengers to check their equipment.

With the detector network aircraft personnel may identify user equipment which are not powered off, or whose safe or other access prevention mode is not activated. When a user equipment attempts to attach through the detection network, the configuration may be such that the user equipment is sent a response that makes the user equipment to stay attached on that network without supporting any other functionality, except emergency calls. This can be achieved by means of standardized features, for example by a reject cause value for "location area not allowed for regional provision of service".

Figure 2:
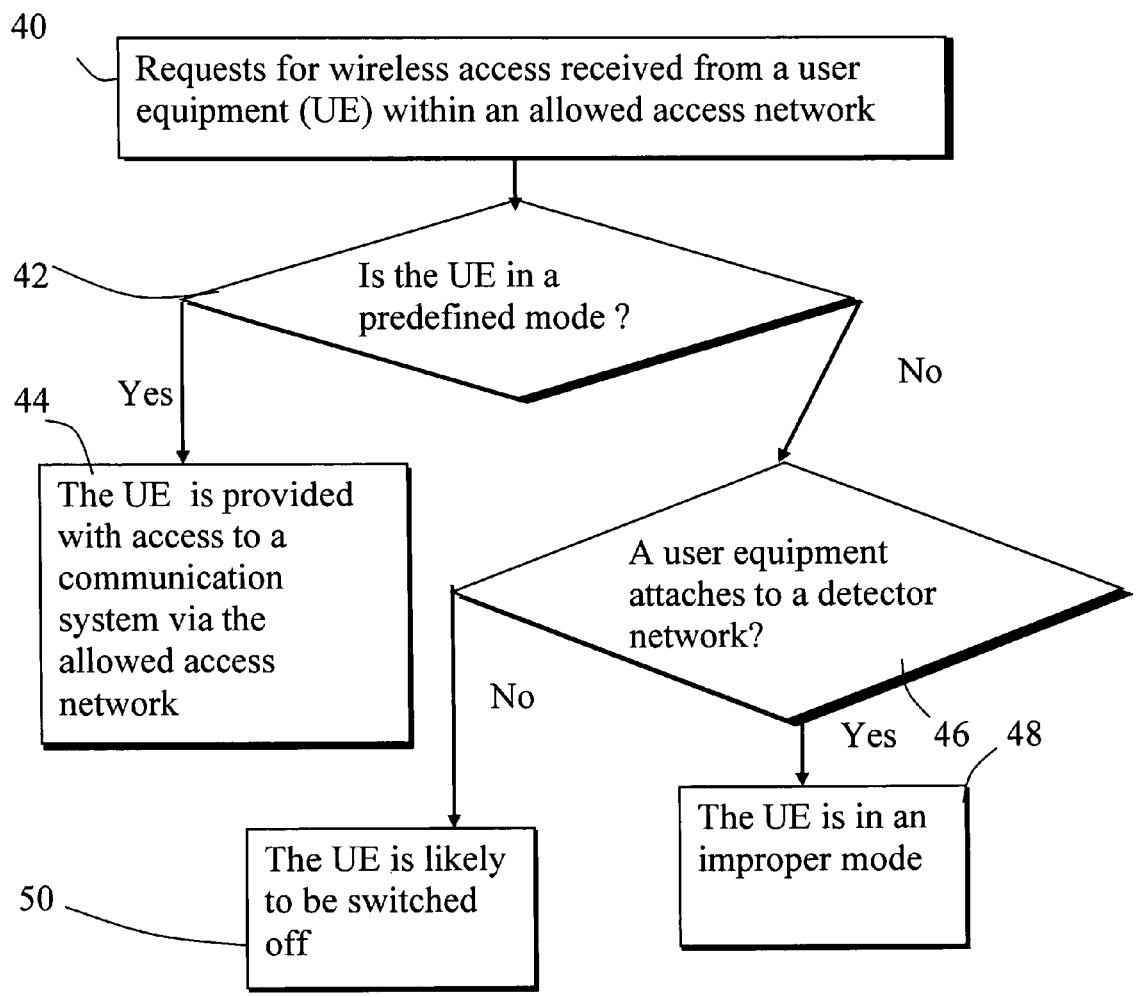
FIG. 2 is a flowchart illustrating an embodiment of the present invention.

A reference is now made to the flowchart of FIG. 2. A user seeks to register with an access network, and therefore sends registration requests at step 40. Signaling from the user equipment is received by the possible access networks. If the user equipment is in at least one such predefined mode that limits its access to a specific access network, the user equipment is registered with that network at step 44. If the user equipment is not in a predefined mode but selects a detector network for registration instead and attaches thereto in step 46, it can then be concluded that the user equipment is not in a mode that would allow its use. If the user equipment is not in a predefined mode and does not attach to the detection network, a conclusion can be made that it is switched off. In practice, such a user equipment would be non-existent for the system.

According to a further embodiment, an allowed access network is configured to monitor for locally available access networks, for example available cells of ground based cellular communication networks. As above, the allowed access network may comprise an onboard access network or cell or any other network provided in an environment wherein wireless access by user equipments to available access networks needs to be controlled.

The monitoring may include monitoring for features such as signal strengths and/or other system information on each cell of a cellular system. The neighbour cell information of the strongest cells of each cellular communication network may be decoded where after at least one common neighbour cell frequency for the strongest cells may be selected. The selected frequency is preferably such that the signal strength on that common frequency or frequencies is relatively low compared to the signal strength on the allowed access network.

A detector cell may then be established at the allowed access network on the previously identified frequency or frequencies corresponding each locally available cellular communication network at a power level that exceeds the power level of the selected cells but also does not disturb operation outside the area of allowed access network, for example outside an aircraft. This is possible even at relatively low transmission powers as the transmitter antenna or antennae can be located fairly close to the intended users. Since the distance to the transmitters of the cells outside the allowed access network is longer, the user equipment will communicate with the onboard access system rather than with systems outside the aircraft.

It might be difficult to find a common frequency if an area is serviced by a plurality of operators. It may this be that more than one frequency needs to be chosen. A detector network arrangement may need to choose more than one frequency, for example, if one common neighbour is not found from the lists of available neighbours.

Such a detector network arrangement may be activated in response to determination that a user equipment is not allowed to access any other networks than the allowed, e.g. onboard access network. The signalling arrangement may be such that it forces the user equipments onboard to reselect the detector cell. This may then indicate to user equipment that support flight safe mode or similar that they need to search and reselect the actual flight safe mode cell or other allowed access network. A user equipment supporting flight safe mode may also properly signal a 'detach' message from the current serving PLMN before changing to be served and controlled by the flight safe mode cell. Legacy terminals or other user equipment which may not be capable of detecting flight safe mode may be forced to stay on the detector cell. According to a possibility, a text message or other indication may be sent to the user instructing the user to select the allowed access network or to switch the user equipment off.

The required data processing functions may be provided by means of one or more data processor entities. All required processing may be provided in the controller 12 of FIG. 1, or control functions of the access and detection networks may be separated. Appropriately adapted computer program code product may be used for implementing the embodiments, when loaded to a computer, for example for computations required when monitoring for improperly switched user equipments and analysis of the users thereof. The program code product for providing the operation may be stored on and provided by means of a carrier medium such as a carrier disc, card or tape. A possibility is to download the program code product via a data network. Implementation may be provided with appropriate software in a server.

It should be appreciated that whilst embodiments of the present invention have been described in relation to user equipment such as mobile telephones, embodiments of the present invention are applicable to any other suitable type of user equipment that may be used for wireless access.

The onboard system or any other system providing a local forced access network system may include a number of access network, for example a number of cells.

It is also understood that although FIG. 1 shows two physically separated networks provided by base stations 11 and 15, this is not always necessary. The two network may only be logically separated while provided by means of a base station system, i.e. a single physical system. If a single physical radio transmitter is used this transmitter may need to be able to transmit simultaneously different narrowband signals representing the signal for each cell, for example a number of different BCCH carriers in the GSM system.

It is understood that other embodiments of the invention are possible, while remaining within the scope of the invention. It is noted that even though the exemplifying communication system shown and described in more detail in this disclosure uses the terminology of the $2^{nd}$ generation (2G) and $3^{rd}$ generation (3G) WCDMA (Wideband Code Division Multiple Access) networks, such as the GSM, UMTS (Universal Mobile Telecommunications System) or CDMA2000 public land mobile networks (PLMN), embodiments of the proposed solution can be used in any communication system providing wireless access for users thereof wherein access of any user equipment may need to be somehow controlled.

It is also noted herein that while the above describes exemplifying embodiments of the invention, there are several variations and modifications which may be made to the disclosed solution without departing from the scope of the present invention as defined in the appended claims.

The invention claimed is:

1. A system comprising:
    a detector network configured to receive requests for wireless access from a plurality of user equipments and to detect such user equipments that seek to use the detector network for communication instead of an allowed access network; and
    a controller configured to determine signal strengths of different frequencies of available communication networks, each providing a plurality of access networks, to determine neighboring access networks for at least one of strongest access networks of each available communication network, and to select at least one common frequency for the neighboring access networks such that a first signal strength of the at least one frequency is relatively low compared to a second signal strength of the allowed access network.

2. An apparatus, comprising:
    a controller configured to control a detector network covering at least partially an area of an allowed access network;
    an analyzer configured to analyze requests for wireless access from a plurality of user equipments; and
    a detector configured to detect such user equipments that seek to use the detector network for communication instead of the allowed access network,
    wherein the controller is configured to determine signal strengths of different frequencies of available communication networks, each providing a plurality of access networks, to determine neighboring access networks for at least one of strongest access networks of each available communication network, and to select at least one common frequency for the neighboring access networks such that a first signal strength of the at least one frequency is relatively low compared to a second signal strength of the allowed access network.

3. A method comprising:
- receiving requests for wireless access from a plurality of user equipments within a first access network configured to allow the plurality of user equipments to access a communication system in an environment wherein said wireless access to the communication system is restricted;
- monitoring, by a detection network, for user equipments that are seeking for communication via another access network than the first access network based on wireless signals transmitted by the user equipments; and
- determining signal strengths of different frequencies of available communication networks, each providing a plurality of access networks, determining neighboring access networks for at least one of strongest access networks of each available communication network, and selecting at least one common frequency for the neighboring access networks such that a first signal strength of the at least one frequency is relatively low compared to a second signal strength of the allowed access network.

4. The method as claimed in claim 3, further comprising serving, by the first access network, such a set of said plurality of user equipments that are in a predefined mode of operation.

5. The method as claimed in claim 4, further comprising offering, by the detector network, an option for said wireless access for another set of the plurality of user equipments in the first access network and a mode of operation that is other than the predefined mode of operation.

6. The method as claimed in claim 5, further comprising offering, by the detector network, better radio characteristics for wireless communication than what is offered by the first access network.

7. The method as claimed in claim 3, further comprising offering, by the detector network, said wireless access for a user equipment through the detector network to a communication network to which said user equipment was connected to before the user equipment attached to the first access network.

8. The method as claimed in claim 3, further comprising determining an identity of a user equipment accessing the detector network.

9. The method as claimed in claim 8, wherein said determining comprises determining the identity of the user equipment based on information from at least one of a subscriber data base and a passenger database.

10. The method as claimed in claim 3, further comprising directing a user equipment to seek for attachment with the first access network.

11. The method as claimed in claim 10, further comprising:
- determining, by the user equipment, that the first access network needs to be selected.

12. The method as claimed in claim 3, further comprising controlling a user equipment through the first access network.

13. The method as claimed in claim 3, further comprising wireless communication between a user equipment and a wireless access system of an aircraft.

14. A computer program embodied on a computer-readable medium, said program configured to control a computer to perform a method, the method comprising:
- receiving requests for wireless access from a plurality of user equipments within a first access network configured to allow the plurality of user equipments to access a communication system in an environment wherein said wireless access to the communication system is restricted; and
- monitoring, by a detection network, for user equipments that are seeking for communication via another access network that the first access network based on wireless signals transmitted by the user equipments; and
- determining signal strengths of different frequencies of available communication networks, each providing a plurality of access networks, determining neighboring access networks for at least one of strongest access networks of each available communication network, and selecting at least one common frequency for the neighboring access networks such that a first signal strength of the at least one frequency is relatively low compared to a second signal strength of the allowed access network.

15. The apparatus of claim 2, wherein the allowed access network is configured to serve only a set of said plurality of user equipments that are in a predefined mode of operation.

16. The apparatus of claim 15, wherein the controller is further configured to control the detector network to provide a preferred option for said wireless access for another set of said plurality of user equipments that are in the allowed access network and in a mode of operation that is other than the predefined mode of operation.

17. The apparatus of claim 16, wherein the controller is further configured to control the detector network to provide better radio characteristics than the allowed access network.

18. The apparatus of claim 16, wherein the controller is further configured to control the detector network to offer said wireless access for a user equipment through the detector network to a communication network to which said user equipment was connected to before the user equipment entered the allowed access network.

19. The apparatus of claim 2, wherein the allowed access network comprises an access network provided on an aircraft.

20. An apparatus, comprising:
- controller means for controlling a detector network covering at least partially an area of an allowed access network;
- analyzing means for analyzing requests for wireless access from a plurality of user equipments;
- detecting means for detecting such user equipments that seek to use the detector network for communication instead of the allowed access network;
- means for determining signal strengths of different frequencies of available communication networks, each providing a plurality of access networks;
- means for determining neighboring access networks for at least one of strongest access networks of each available communication network; and
- means for selecting at least one common frequency for the neighboring access networks such that a first signal strength of the at least one frequency is relatively low compared to a second signal strength of the allowed access network.

* * * * *